May 6, 1924. 1,493,284
H. SAVAGE
TROLLEY HARP AND SHOE
Filed Jan. 19, 1924
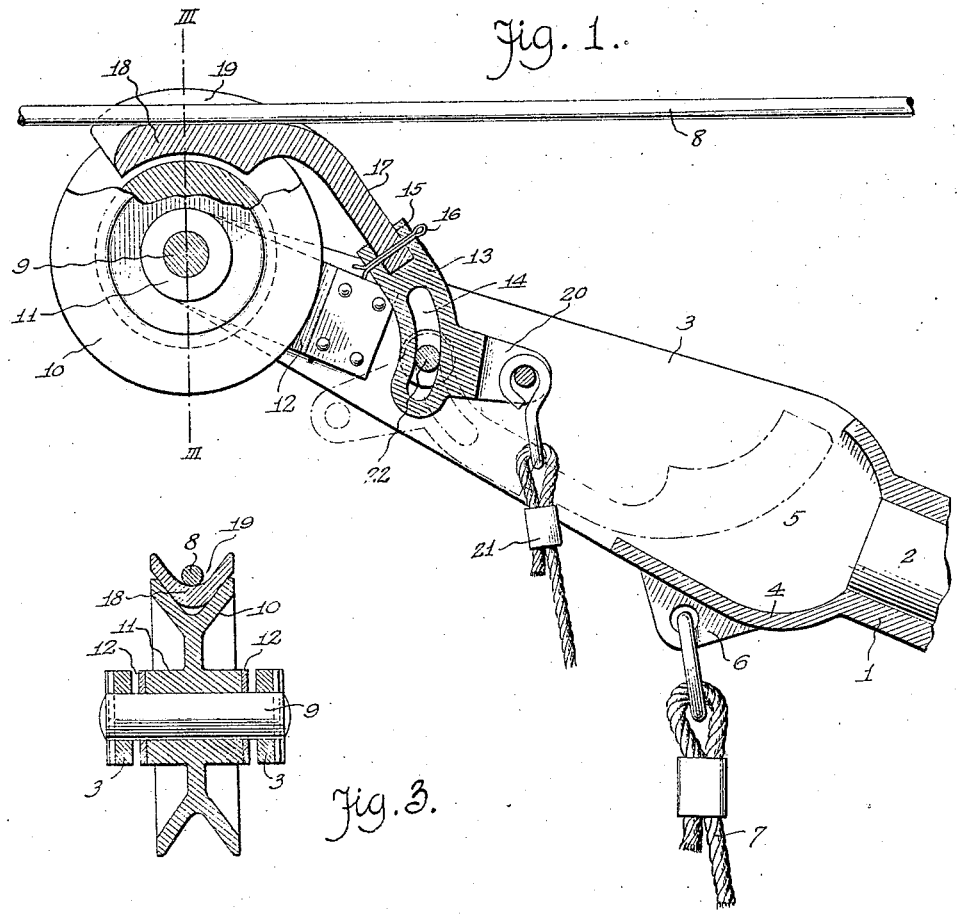
Fig. 1.
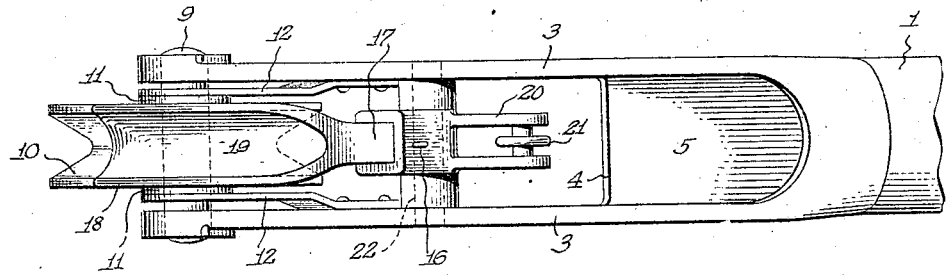
Fig. 3.
Fig. 2.
Inventor
Hugh Savage,
By
Attorneys Patented May 6, 1924.

1,493,284

UNITED STATES PATENT OFFICE.

HUGH SAVAGE, OF DETROIT, MICHIGAN.

TROLLEY HARP AND SHOE.

Application filed January 19, 1924. Serial No. 687,161.

*To all whom it may concern:*

Be it known that I, HUGH SAVAGE, a citizen of the United States, residing at Detroit, in the county of Wayne and State of Michigan, have invented certain new and useful Improvements in Trolley Harps and Shoes, of which the following is a specification, reference being had therein to the accompanying drawings.

Interurban electrically operated cars are often provided with shoes to engage a trolley, rail or other conductor and said shoes are not suitable for trolley wire contact when the interurban cars travel into a city having an overhead trolley system, therefore a trolley harp which will permit of an interurban car being operated either in or out of city limits will facilitate changing over such car so that it will conform to the requirements of the two electrical systems.

My invention aims to provide a trolley harp which may be used for city or interurban service and the harp includes a novel shoe that may be swung into an overlying position on a trolley wheel to establish an electrical connection between the wheel and the trolley wire or other electrical conductor. The shoe may be also swung to an inactive pocketed position in a harp so as not to interfere with the movement of the trolley wheel on a trolley wire, and the adjustability of the shoe is such that its weight will at all times retain the shoe in either of the above mentioned positions.

The construction entering into my invention will be hereinafter specifically described and then claimed, and reference will now be had to the drawing, wherein Figure 1 is a longitudinal sectional view of a trolley harp provided with an adjustable shoe in accordance with my invention;

Fig. 2 is a plan of the same, and

Fig. 3 is a cross sectional view taken on the line III—III of Fig. 1.

In the drawing, the reference numeral 1 denotes a portion of a trolley harp socket adapted to be mounted on the upper end of a trolley pole 2 or other support and the harp socket 1 has opposed parallel arms 3, which at their juncture with the socket 1, are connected by webs 4 forming a pocket 5 between the arms 3. One of the webs 4 may have apertured ears 6 for connection with a trolley harp rope 7 or other flexible member by which the trolley harp may be manually moved relative to a trolley wire 8, rail or other form of electrical conductor.

Mounted in the outer ends of the harp arms 3 is a pin 9 and rotatable on said pin is a grooved trolley wheel 10 and having its hub portion 11 frictionally engaged by opposed resilient members 12 suitably attached to the inner confronting faces of the arms 3 and adapted to establish an electrical connection between the harp arms 3 and the wheel 10.

Connecting the harp arms 3, adjacent the wheel 10 is a pin 22 and loosely mounted on said pin is an adjustable curved member 13 having a slot 14 through which the pin 22 extends. The adjustable member 13 has one end thereof provided with a socket 15 and detachably mounted in said socket by a cotter pin 16 or other fastening means, is the inner reduced end 17 of a grooved shoe 18. The shoe 18 is arcuated in side elevation and V-shaped in cross section so that said shoe may overlie the wheel 10, fit in the groove of said wheel, and provide a groove 19 for the trolley wire 8.

The inner end of the adjustable member 13 has apertured ears 20 or a suitable connection for an auxiliary trolley rope 21 or other flexible member by which the adjustable member may be manually swung from one position to another, the active position of said adjustable member being shown by full lines in Fig. 1, and an inactive position of said adjustable member by dot and dash lines.

With the wire engaging shoe 18 in an active position the weight of said shoe on the trolley wheel 10 and the pressure of the trolley harp in the direction of the trolley wire 8 will establish an intimate electrical contact between the wire, shoe and wheel, the latter being held non-rotatable by the shoe interposed between the wheel and wire.

By lowering the trolley harp and pulling on the rope 21 the shoe 18 can be swung in an inactive position in the pocket 5 and will remain therein, while the wheel 10 is used against the wire 8 or any other conductor for establishing an electrical connection.

With the shoe 18 detachably connected to the adjustable member 13 it is an extremely easy matter to discard a worn shoe and substitute another therefor, and the adjustable member 13 may be made of a less expensive material than the shoe which is ordinarily hardened or of such indurate material as to withstand considerable wear.

The shoe 18 may have a wire engaging surface which is roughened or provided with sleet removing protuberances, which by contact with a sleet covered or like conductor will cause the sleet to be removed and at the same time establish an electrical connection. It is obvious that such a shoe may be quickly substituted for an ordinary shoe when it is desired to remove sleet or other matter from a trolley wire.

While in the drawing there is illustrated a preferred embodiment of my invention, it is to be understood that the structural elements are susceptible to such changes, in size, shape and manner of assembling as fall within the scope of the appended claims.

What I claim is:—

1. In a trolley harp, a trolley wheel, an adjustable member in said harp and having a pin and slot connection therewith, and a shoe detachably connected to said member and adapted to overlie said trolley wheel.

2. The combination of a trolley harp having a pocket, a trolley wheel journaled in said harp, an adjustable member in said harp, a shoe carried by said adjustable member and in one position extending into the harp pocket and in another position extending over said wheel, and means attached to said adjustable member for moving it so as to swing said shoe from one position to the other.

3. The combination set forth in claim 2, wherein the configuration and mounting of said adjustable member permits the weight of said shoe to retain said adjustable member and said shoe in either of said positions.

In testimony whereof I affix my signature in presence of two witnesses.

HUGH SAVAGE.

Witnesses:
KARL H. BUTLER,
ANNA M. DORR.